Jan. 9, 1968   C. W. STEWART   3,362,223
GAS METER CRANK ASSEMBLY HAVING THERMALLY-RESPONSIVE
COMPENSATING MEANS
Filed April 7, 1965   2 Sheets-Sheet 1
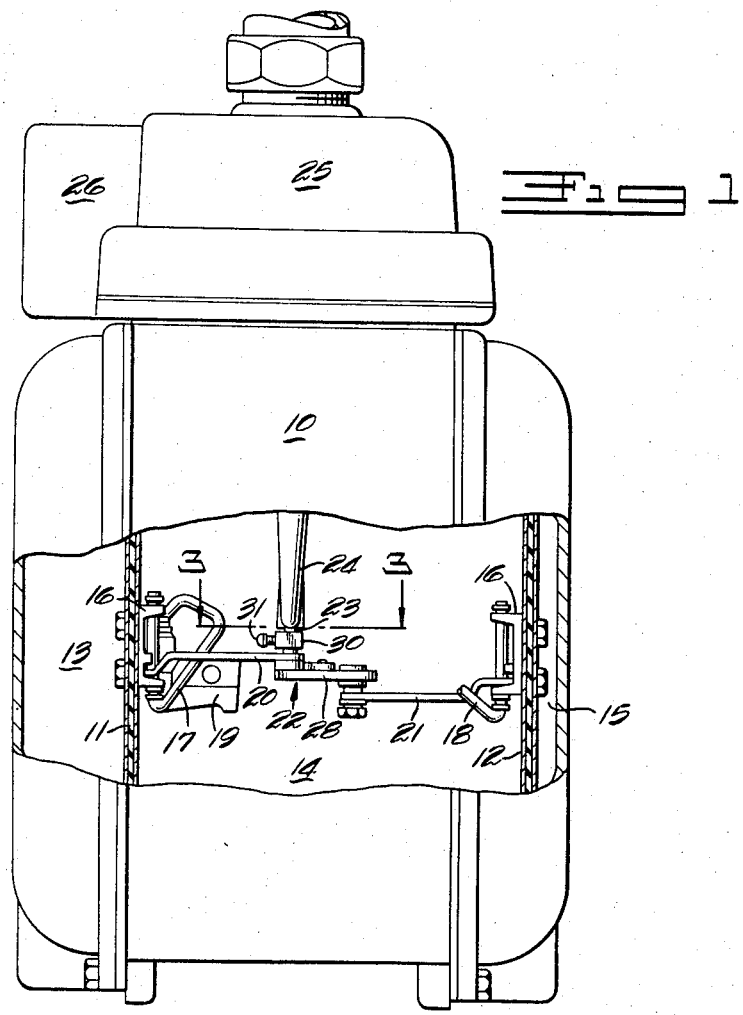
Fig. 1
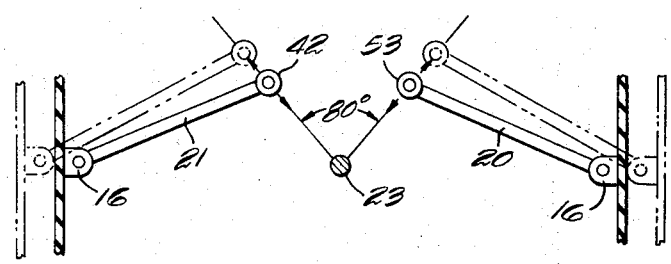
Fig. 2
INVENTOR.
CHARLES W. STEWART
BY
MAHONEY, MILLER & RAMBO
BY 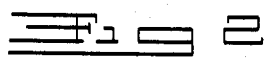
ATTORNEYS

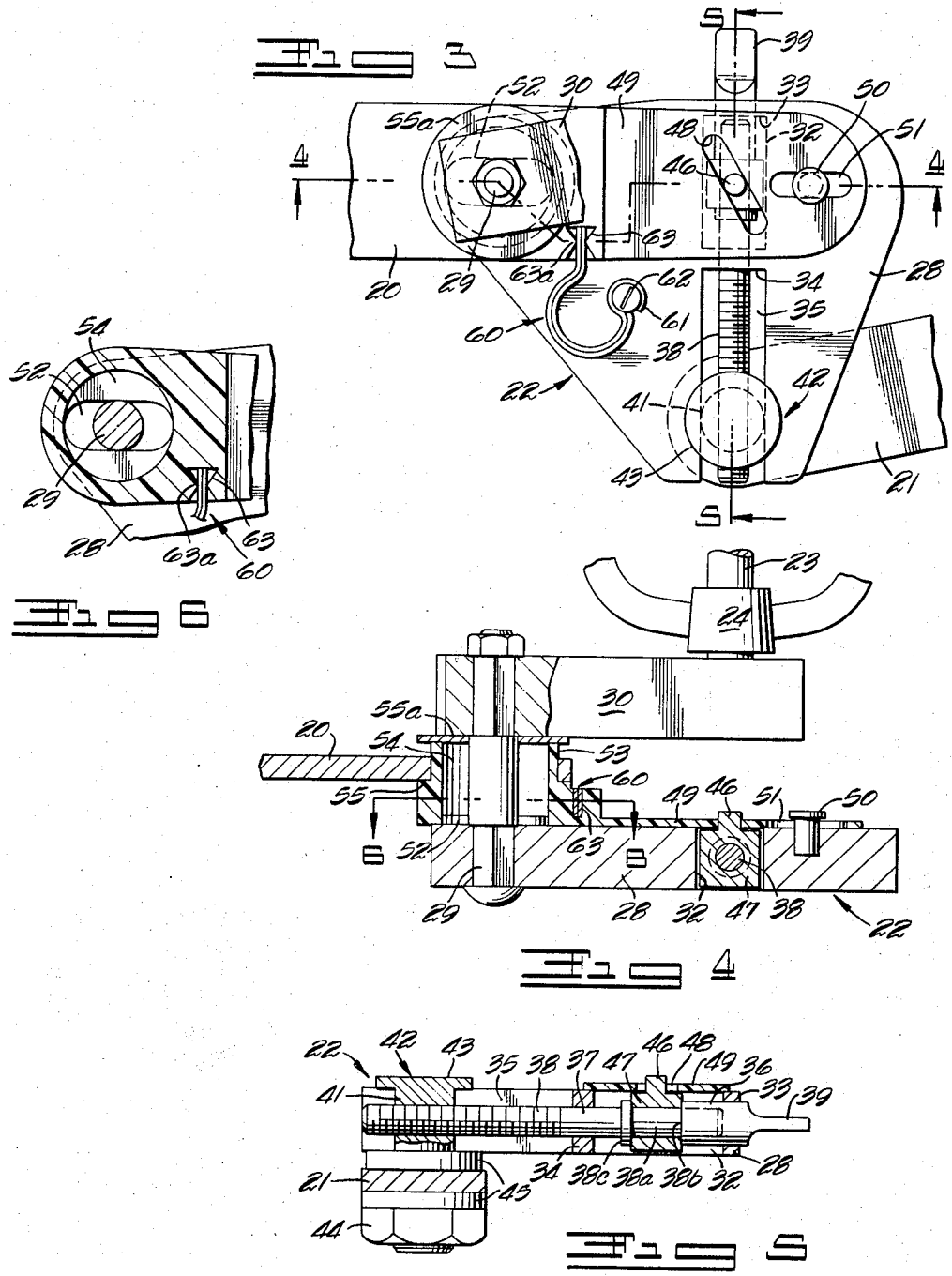

United States Patent Office 3,362,223
Patented Jan. 9, 1968

3,362,223
GAS METER CRANK ASSEMBLY HAVING THERMALLY-RESPONSIVE COMPENSATING MEANS
Charles W. Stewart, Lancaster, Ohio, assignor, by mesne assignments, to Lancaster Meter Parts Co., Lancaster, Ohio, a corporation of Arizona
Filed Apr. 7, 1965, Ser. No. 446,189
5 Claims. (Cl. 73—281)

ABSTRACT OF THE DISCLOSURE

A diaphragm-actuated crank mechanism for a double diaphragm-type gas meter embodying a thermally-responsive member carried in association with the crank mechanism for automatically and simultaneously adjusting the operating strokes of the diaphragms in response and in proportion to variations of ambient temperatures.

---

This invention relates generally to diaphragm-type gas meters and more specifically to an improved thermally responsive crank mechanism for automatically and simultaneously adjusting the operating strokes of a pair of interconnected diaphragms of a gas meter.

In recent years, it has become customary to install gas meters out of doors where, in areas of changing climate, they are subjected to extreme temperature variations. As is well-known by Charles' law, the volume of a gas changes in direct proportion to changes of temperature of the gas. Thus, a gas meter which is preset or calibrated to measure and indicate the volume of gas passing therethrough at a given temperature, say 70° F., will give an inaccurate measurement or "reading" at considerably lower or higher temperatures. While it has heretofore been proposed to equip gas meters of this general type with temperature compensating devices which are operable to change the operating or displacement strokes of both diaphragms in accordance with temperature variations, these prior art thermally-responsive compensators have been comparatively complex and expensive to manufacture and install as well as to maintain, and in certain cases, cause further inaccuracies in the meter readings.

Accordingly, it is the primary object of this invention to provide a comparatively simple and relatively inexpensive thermally-responsive mechanism which functions automatically and accurately to adjust the operating or displacement strokes of both diaphragms of a gas meter to thereby compensate for changes in volume of gas brought about by temperature variations.

A further object of this invention is to provide a thermally-responsive compensating mechanism of the type indicated which includes a thermally-responsive element incorporated in a simple manner into the crank assembly between the two diaphragms of a three chamber gas meter, whereby the operating strokes of both diaphragms will be adjusted automatically and simultaneously in accordance with and in proportion to temperature variations.

Another object of this invention is to provide an improved thermally-responsive crank assembly for a double diaphragm gas meter which functions automatically in response to change of ambient temperature to vary the effective strokes of the diaphragm to thereby maintain an accurate "reading" by the meter regardless of temperature variations, and which is so constructed as to maintain the desired angular spacing between the throws of the crank assembly at all positions of stroke adjustment df the diaphragms.

These and additional objects and advantages of the present invention will become more readily apparent by reference to the following description and the accompanying drawings, wherein:

FIG. 1 is a side elevational view, partially broken away, of a two diaphragm, three chamber gas meter of the type to which the thermally-responsive adjusting mechanism of the present invention is applicable;

FIG. 2 is a diagrammatic top plan view showing the pattern of adjustment of the diaphragm pitman links relative to the main drive shaft of the meter;

FIG. 3 is an enlarged horizontal sectional view taken along the line 3—3 of FIG. 1 and showing the adjusting mechanism of this invention;

FIG. 4 is a vertical sectional view taken along the line 4—4 of FIG. 3;

FIG. 5 is a vertical sectional view taken along the line 5—5 of FIG. 3; and

FIG. 6 is a detailed horizontal sectional view taken along the line 6—6 of FIG. 4.

Referring now to the drawings, FIG. 1 illustrates a typical three chamber, two diaphragm, Sprague-type gas meter in which the present, improved crank mechanism is incorporated. The meter, as shown, includes a main casing 10 in which is mounted a pair of opposed, reciprocatory diaphragms 11 and 12. The diaphragms 11 and 12 divide the casing 10 internally into three separate measuring chambers, 13, 14 and 15. Rigidly connected with the central portion of each of the diaphragms 11 and 12 at the inner face thereof is the usual hinge bracket 16. The hinge bracket 16 and the central, flexing portion of each diaphragm are supported and guided for back-and-forth reciprocation by the usual bent carrier wires 17 and 18 which, in turn, are pivotally or hingedly connected with stationary mounting brackets 19 secured to the adjacent inner side walls of the casing 10. Pivotally connected with the respective hinge brackets 16 are the outer end portions of a pair of diaphragm-actuated pitman links 20 and 21. The inner end portions of the pitman links 20 and 21 are pivotally connected with the present improved crank assembly, which is designated generally by the reference numeral 22 in FIG. 1, and which will be hereinafter described in detail. The crank assembly 22 is supported upon and is drivingly connected with the lower end of the main drive shaft 23 of the meter. In the usual manner, the drive shaft 23 extends vertically upwardly through the center chamber 14 of the meter and is journaled for axial rotation in a stationary bearing bracket 24 which depends from and is rigidly supported by the interior framework of the meter, not shown.

As will be readily understood by those skilled in the art, the upper end portion of the drive shaft 23 is connected to drive a gyrating or orbiting valve member, not shown, which is conventionally mounted within the usual distributing chamber defined by a valve casing 25. The valving mechanism, not shown, functions to control the flow of gas to and from the measuring chambers 13, 14, and 15 and the movement of the orbiting valve member is suitably translated by an index drive mechanism, also not shown, to drive the flow-indicating and recording mechanism of the meter which is contained in the register housing or casing 26.

With the exception of the present improved diaphragm-actuated crank assembly 22, the parts of the gas meter, as heretofore described, are conventional, and as such, form no part of the present invention.

The crank assembly 22, as shown best in FIGS. 3–6, comprises a crank plate 28 which is of generally triangular shape and which is supported in a generally horizontal plane for rotation about a vertical axis coincident to the axis of rotation of the main drive shaft 23. The crank plate 28 is nonrotatively connected with and supported by the lower end portion of a crank pin 29 which, in turn, is nonrotatively connected with and supported in depending relation to a crank arm 30 drivingly connected with the lower end of the drive shaft 23. In the usual manner, the crank arm 30 may be provided with an adjustment screw mechanism, indicated generally by the reference numeral 31 in FIG. 1, by means of which the crank arm 30 may be rotationally adjusted and indexed on the drive shaft 23.

The crank pin 29 serves to connect the crank plate 28 for rotation as a unit with the crank arm 30 about the axis of the shaft 23, while at the same time, maintaining the plate 28 in vertically spaced, parallel relation to the crank arm 30. The crank plate 28 is formed in the area of its axis of rotation with a first, vertically opening, rectangular slot 32 whose long axis extends radially of the axis of rotation of the crank plate 28. The slot 32 is bounded at one end by an edge wall 33 of the plate and at its opposite end by a divider web or wall 34. A second, elongated, rectangular slot 35 is formed in the crank plate 28 in longitudinal alignment with the first slot 32, but is separated from the first slot 32 by the divider wall 34. The walls 33 and 34 of the crank plate 28 are formed with axially aligned bearing openings which rotatively and slidably receive the unthreaded cylindrical journal portions 36 and 37 of an otherwise threaded adjusting screw 38. The adjusting screw 38 extends longitudinally and axially through both of the slots 32 and 35 and is arranged in perpendicular, radial relation to the axis of rotation of the crank plate 28. The screw 38 is provided at its outer end with a flattened actuating knob or handle 39 by which the screw may be manually rotated. The journals 36 and 37 are of substantial length so that the screw 38 can move bodily axially in the openings in the respective walls 33 and 34 as well as rotate therein.

Threadedly engaged with the outer end portion of the adjusting screw 38 is the vertically extending shank portion 41 of a bearing post 42. As will be noted in FIGS. 3 and 5, the diameter of the cylindrical shank portion 41 of the bearing post 42 closely approximates the width of the slot 35, whereby to provide for longitudinal sliding movement of the bearing post 42 within the slot 35 upon axial rotation of the screw 38. The upper end of the post 42 is formed with a relatively enlarged and flattened head 43 which overlies the upper surfaces of the crank plate 28 on either side of the slot 35 and supports the post for sliding movement within the slot. The lower end portion of the bearing post 42 projects below the crank plate 28 and pivotally receives the apertured inner end portion of the pitman link 21. A retaining nut 44 is threaded onto the lower end of the post 42, and a pair of spacer washers 45 are carried on the lower end portion of the post 42 on opposite sides of the pitman link 21 to prevent binding of the link on the post.

Slidably carried within the inner slot 32 of the crank plate 28 is a cam stud 46 which is mounted on the screw 38 for bodily movement therewith. The cam stud 46 is formed with a rectangular, tubular body portion 47 having a bore which rotatably receives the unthreaded portion 38a of the screw 38, and is retained between the stop shoulders 38b and 38c axially spaced on the screw. Thus, by rotating the screw 38, the bearing post 42 may be adjusted radially with respect to the axis of rotation of the crank plate 28 to initially index or preset the location of the post 42. The cam stud 46 projects upwardly above the upper surface of the crank plate 28 and through a diagonal cam slot 48 formed toward the inner end of a slidable link or arm 49. The arm 49 is mounted for limited sliding movement on the upper surface of the crank plate 28 by means of a headed guide pin 50 carried by the crank plate and extending upwardly through an elongated guide slot 51 formed longitudinally in the inner end portion of the arm 49. Additionally, the outer end portion of the arm 49 is formed with an elongated, longitudinally disposed guide slot 52 which slidably embraces the crank pin 29. The longitudinal axis of the arm 49 is disposed radially of the axis of rotation of the crank plate 28 and in approximately 80° angular relation to the axis of the screw 38.

The outer end of the link or arm 49 is formed or otherwise provided with an annular, upstanding bearing post or collar 53. The bearing collar 53 projects upwardly from the arm 49 in the space between the crank plate 28 and the crank arm 30, and is formed with an enlarged axial bore 54 having a diameter approximately equal to the length of the slot 52 formed in the arm 49. Thus, the bearing collar 53 is movable bodily with the arm 49 radially inwardly and outwardly with respect to the axis of rotation of the crank plate 28. Additionally, the bearing collar 53 is formed on its outer periphery with a stepped shoulder portion 55, and the inner, apertured end of the opposite pitman link 20 is pivotally engaged with the collar 53 about the shoulder portion 55. An annular washer 55a is carried on the crank pin 29 between the upper edge of the collar 53 and the outer end of the crank arm 30.

As previously indicated, this invention provides a temperature compensating means in the crank assembly 22 to adjust the assembly automatically in accordance with temperature variations to change the displacement stroke of both diaphragms, whereby to compensate for variations in volume brought about by temperature changes in accordance with Charles' law. This compensating means may take the form of a bi-metallic strip which is indicated generally at 60 in FIGS. 3 and 4 and the opposite ends of which are operatively connected respectively to the crank plate 28 and the link or arm 49. Thus, the bi-metallic strip 60 is disposed on edge and has a curled or hooked end portion 61 resting on the upper surface of the crank plate 28 and securely anchored to that plate by a screw 62. The free end portion of the strip 60 is positioned within a socket or slot 63 formed in the longitudinal edge of the arm 49. As will be noted in FIG. 3, the slot 63 is of hour glass configuration and provides a relatively narrow, central bearing portion 63a to snugly, but slidably receive the outer end portion of the bi-metal strip 60. The bi-metal strip 60 is formed and arranged so as to index or maintain the arm 49 in a predetermined position on the plate 28 when the ambient temperature is at a given norm, say for example, 60° F. However, as the ambient temperature decreases, the bi-metal strip 60 contracts and moves the outer end portion of the strip rightwardly, as viewed in FIG. 3, and thus slides the arm 49 radially inwardly of the axis of rotation of the crank plate 28. Conversely, as the ambient temperature increases above the norm, or initial indexing temperature, the outer end of the bi-metal strip 60 moves leftwardly, as viewed in FIG. 3, to thus shift the arm 49 radially outwardly with respect to the axis of rotation of the crank plate 28. This radial movement of the arm 49, in response to thermal deflection of the bi-metal strip 60, results in simultaneous radial adjustment of the bearing posts 53 and 42 which define the eccentrically disposed throw arms or journals of the crank assembly. Consequently, as the bearing posts 53 and 42 are shifted radially with respect to the axis of rotation of the crank assembly, the strokes of the diaphragms 11 and 12 will be proportionately varied so as to displace a greater or lesser volume of gas through the chambers 13, 14, and 15 of the gas meter.

As will be noted, the bearing post 53 for the pitman link 20 is carried directly by and forms an integral part of the arm 49, and hence is movable bodily therewith. Simultaneous radial adjustment of the bearing post 42, in response to radial movement of the arm 49, is also attained due to the interfitting connection between the diagonal cam slot 48 and the cam follower stud 36. Thus, assuming that the arm 49 is shifted rightwardly from the position shown in FIG. 3, the angular arrangement of the slot 48 causes the stud 46 to move upwardly (FIG. 3) in the slot 48, to thus bodily shift the screw 38 inwardly and axially of the slots 32 and 35 of the crank plate 28. This inward bodily movement of the screw 38 causes the bearing post 42 carried thereon to be drawn radially inwardly toward the axis of rotation of the crank assembly in direct proportion to the inward radial movement of the other bearing post 53. Conversely, when the arm 49 moves leftwardly, in response to an increase of ambient temperature, the two bearing posts 42 and 53 are moved simultaneously radially outwardly to the same extent with respect to the axis of rotation of the crank assembly. It is here important to note that the desired angular spacing (80°) of the bearing posts 42 and 53 with respect to the axis of rotation of the crank assembly, is maintained at all times regardless of the radially adjusted positions of the posts 42 and 53. This is extremely desirable, in order to prevent a change of timing in the strokes of the diaphragms which would otherwise occur with a change in the relative angular positions of the bearing posts. As previously indicated, rotational adjustment of the screw 38 is provided solely for the purpose of initially indexing or presetting the radial position of the bearing post 42 with respect to the axis of rotation of the crank assembly. In other words, once the screw 38 has been rotatively adjusted to adjust the stroke of the diaphragm 12 in relation to the stroke of the opposite diaphragm 11, then the preset crank assembly is in condition for automatic adjustment by the bi-metal element 60 in response to temperature variations.

The simultaneous adjustment of the diaphragm strokes is indicated diagrammatically in FIG. 2 of the drawings, wherein it will be noted that the bearing post 42 and the bearing collar 53 are movable simultaneously radially inwardly and outwardly of the axis of rotation of the crank plate 28, as defined by the axis of rotation of the drive shaft 23. The linear paths of adjustment of the bearing post 42 and the bearing collar 53 are disposed in acute angular relation and define an included angle of approximately 80°. Thus, it will be seen that the rotational angle between the bearing post 42 and the bearing collar 53 remains constant regardless of the adjusted position of the post and collar.

In view of the foregoing, it will be seen that the present invention provides a mechanically simple, yet highly efficient diaphragm-actuated crank assembly for a three chamber gas meter, and one which provides for the simultaneous and proportional adjustment of the throw arms of the crank assembly in response to changes of ambient temperature. Thus, the present crank assembly is effective to automatically compensate for volumetric change, due to temperature variation, by proportionately changing the strokes of the diaphragm of the meter.

While a single preferred embodiment of the invention has been illustrated and described in detail, it will be manifest that various modifications as to details of construction and design may be resorted to without departing from the spirit of the invention or the scope of the following claims.

Having thus described this invention, what is claimed is:

1. In a diaphragm-actuated crank assembly of a gas meter; a crank plate rotatable about a substantially vertical axis; a threaded adjusting screw rotatably and slidably carried by said crank plate and disposed in radial, intersecting relation to the axis of rotation of said crank plate; a first bearing post slidably carried by said crank plate in eccentric relation to the axis of rotation of said plate and threadedly engaged with said screw; a first diaphragm-actuated link pivotally connected with said first bearing post; a stud member carried in a fixed axial position on said screw inwardly of said bearing post, an arm slidably carried on said crank plate and having a longitudinal axis disposed in angularly offset relation to the axis of said screw and in radial intersecting relation to the axis of rotation of said crank plate, said arm being formed with a diagonal slot embracing said stud member and being movable radially inwardly and outwardly with respect to the axis of rotation of said crank plate to vary the radial position of said first bearing post with respect to the axis of rotation of said crank plate; a second bearing post rigidly carried by and movable with said arm and disposed in eccentric relation to the axis of rotation of said crank plate and in rotationally spaced relation to said first bearing post; a second diaphragm-actuated link pivotally connected with said second bearing post, and thermally responsive means connected between said crank plate and said arm and operable to move said arm radially with respect to the axis of rotation of said crank plate in response to variations in ambient temperatures.

2. A diaphragm-actuated crank assembly as defined in claim 1 wherein said thermally responsive means comprises a bi-metal strip having one end thereof secured to said crank plate and an opposite end connected with said arm.

3. In a diaphragm-actuated crank assembly of a gas meter; a crank plate rotatable about a substantially vertical axis, a pair of angularly related members slidably carried on said crank plate for movement radially of the axis of rotation of said crank plate, a pair of throw journals carried respectively by said members, one of said members being rotatively adjustable on said plate to vary the position of the throw journal carried thereby relative to the axis of rotation of said crank plate, means connecting said members for simultaneous radial movement with respect to the axis of rotation of said crank plate, and a bi-metal actuator connected between said plate and one of said members and responsive to variations in ambient temperatures for simultaneously moving said members radially of the axis of rotation of said crank plate.

4. A diaphragm-actuated crank assembly comprising a crank member rotatable about a selected axis, a pair of bearing supporting members slidably mounted on said crank member in radially, intersecting relation to the axis of rotation of said crank member and in predetermined angular relationship to one another, cam means connecting said bearing supporting members together for simultaneous radial movement with respect to the axis of rotation of said crank member, and temperature responsive means for moving said bearing supporting members, said means comprising a bi-metallic strip mounted on said crank member and operatively connected to one of said bearing supporting members.

5. A diaphragm-actuated crank assembly comprising a crank plate rotatable about a selected axis, a pair of bearing supporting members mounted on said crank plate for movement radially of said axis in predetermined angular relationship to one another, each of said members carrying a bearing means for connection to a diaphragm link, one of said members being rotatively adjustable on said crank plate to vary the position of the bearing means carried thereby relative to the axis of rotation of said crank plate, and thermally-responsive means operatively connected between said crank plate and one of said bearing supporting members for simultaneously adjusting both of said members radially on said crank plate in response to temperature variations.

References Cited
UNITED STATES PATENTS

| | | | |
|---|---|---|---|
| 2,296,476 | 9/1942 | McIntire | 73—281 |
| 2,296,485 | 9/1942 | Whitworth | 73—281 |
| 2,932,198 | 4/1960 | Whitworth | 73—281 |
| 3,177,713 | 4/1965 | Hutchison et al. | 73—281 |
| 3,177,714 | 4/1965 | Mayeran | 73—281 |

RICHARD C. QUEISSER, *Primary Examiner.*

JAMES J. GILL, *Examiner.*

E. D. GILHOOLY, *Assistant Examiner.*